United States Patent
Shanks et al.

(10) Patent No.: US 8,458,745 B2
(45) Date of Patent: Jun. 4, 2013

(54) AMALGAMATION OF USER DATA FOR GEOGRAPHICAL TRENDING

(75) Inventors: David E. Shanks, Los Angeles, CA (US); Jon M. Dean, Torrance, CA (US); David E. Feldstein, Santa Monica, CA (US); Richard F. Purpura, Orange, CA (US); Matthew J. Thompson, Torrance, CA (US); Mark A. Shurgot, Los Angeles, CA (US); Craig Le, Temple City, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 312 days.

(21) Appl. No.: 11/707,496

(22) Filed: Feb. 16, 2007

(65) Prior Publication Data

US 2007/0240180 A1    Oct. 11, 2007

Related U.S. Application Data

(60) Provisional application No. 60/774,352, filed on Feb. 17, 2006.

(51) Int. Cl.
*H04N 5/445*   (2011.01)

(52) U.S. Cl.
USPC ........ 725/40; 725/9; 725/14; 725/39; 725/44; 725/46; 725/59

(58) Field of Classification Search
USPC ....... 725/9, 14, 35, 40, 44, 46, 47, 59; 705/10
See application file for complete search history.

(56) References Cited

U.S. PATENT DOCUMENTS

| | | | |
|---|---|---|---|
| 5,530,469 A | 6/1996 | Garfinkle | |
| 5,561,708 A | 10/1996 | Remillard | |
| 5,621,793 A * | 4/1997 | Bednarek et al. | 380/240 |
| 5,689,799 A * | 11/1997 | Dougherty et al. | 455/2.01 |
| 5,758,257 A * | 5/1998 | Herz et al. | 725/116 |
| 5,758,259 A | 5/1998 | Lawler | |
| 5,790,935 A | 8/1998 | Payton | |
| 5,798,785 A * | 8/1998 | Hendricks et al. | 725/46 |
| 5,828,839 A | 10/1998 | Moncreiff | |
| 5,848,352 A * | 12/1998 | Dougherty et al. | 725/110 |

(Continued)

FOREIGN PATENT DOCUMENTS

| | | |
|---|---|---|
| EP | 0854645 A2 | 7/1998 |
| EP | 1349391 | 10/2003 |

(Continued)

OTHER PUBLICATIONS

Non-final Office Action dated Apr. 16, 2009 in U.S. Appl. No. 11/707,798, filed Feb. 16, 2007 by David E. Shanks et al.

(Continued)

*Primary Examiner* — An Son P Huynh (57) ABSTRACT

The present invention comprises a viewership rating system presented on a monitor. A system in accordance with the present invention comprises a plurality of broadcast programs, each broadcast program in the plurality of broadcast programs given a rating, the rating based on a current viewership of the plurality of broadcast programs within a geographical area, and a control bar; displayed on the monitor, wherein a command displayed on the control bar selects a screen for display on the monitor, the screen comprising information related to at least one of the ratings of the plurality of broadcast programs.

22 Claims, 8 Drawing Sheets

U.S. PATENT DOCUMENTS

| | | | |
|---|---|---|---|
| 5,872,588 A * | 2/1999 | Aras et al. | 725/14 |
| 5,886,732 A | 3/1999 | Humpleman | |
| 5,953,485 A * | 9/1999 | Abecassis | 386/278 |
| 6,005,861 A | 12/1999 | Humpleman | |
| 6,009,116 A * | 12/1999 | Bednarek et al. | 375/130 |
| 6,020,883 A | 2/2000 | Herz et al. | |
| 6,061,082 A | 5/2000 | Park | |
| 6,088,722 A | 7/2000 | Herz et al. | |
| 6,177,931 B1 | 1/2001 | Alexander et al. | |
| 6,236,395 B1 * | 5/2001 | Sezan et al. | 715/723 |
| 6,236,978 B1 * | 5/2001 | Tuzhilin | 705/7.29 |
| 6,295,092 B1 * | 9/2001 | Hullinger et al. | 348/468 |
| 6,298,482 B1 | 10/2001 | Seidman et al. | |
| 6,389,593 B1 | 5/2002 | Yamagishi | |
| 6,457,010 B1 | 9/2002 | Eldering et al. | |
| 6,463,585 B1 * | 10/2002 | Hendricks et al. | 725/35 |
| 6,484,148 B1 * | 11/2002 | Boyd | 705/14.64 |
| 6,530,082 B1 * | 3/2003 | Del Sesto et al. | 725/9 |
| 6,571,279 B1 * | 5/2003 | Herz et al. | 709/217 |
| 6,583,794 B1 * | 6/2003 | Wattenberg | 715/708 |
| 6,637,029 B1 * | 10/2003 | Maissel et al. | 725/46 |
| 6,871,186 B1 * | 3/2005 | Tuzhilin et al. | 705/26.7 |
| 6,898,762 B2 * | 5/2005 | Ellis et al. | 715/716 |
| 6,993,504 B1 * | 1/2006 | Friesen et al. | 705/37 |
| 7,047,550 B1 * | 5/2006 | Yasukawa et al. | 725/44 |
| 7,292,604 B2 * | 11/2007 | Godwin et al. | 370/477 |
| 7,305,691 B2 * | 12/2007 | Cristofalo | 725/34 |
| 7,530,085 B2 * | 5/2009 | Tsuria et al. | 725/25 |
| 7,594,242 B2 * | 9/2009 | Chan | 725/21 |
| 7,962,935 B2 * | 6/2011 | Kurosaki et al. | 725/40 |
| 2001/0027557 A1 * | 10/2001 | Shinkawa et al. | 725/1 |
| 2002/0018077 A1 * | 2/2002 | Powlette | 345/744 |
| 2002/0056087 A1 | 5/2002 | Berezowski et al. | |
| 2002/0104087 A1 * | 8/2002 | Schaffer et al. | 725/46 |
| 2002/0112239 A1 | 8/2002 | Goldman | |
| 2002/0183072 A1 * | 12/2002 | Steinbach et al. | 455/456 |
| 2003/0005438 A1 * | 1/2003 | Crinon et al. | 725/34 |
| 2003/0115585 A1 * | 6/2003 | Barsness et al. | 725/9 |
| 2003/0172374 A1 * | 9/2003 | Vinson et al. | 725/9 |
| 2003/0177504 A1 * | 9/2003 | Paulo et al. | 725/118 |
| 2003/0217166 A1 * | 11/2003 | Dal Canto et al. | 709/229 |
| 2003/0217365 A1 * | 11/2003 | Caputo | 725/95 |
| 2004/0008729 A1 | 1/2004 | Rogerson et al. | |
| 2004/0073915 A1 * | 4/2004 | Dureau | 725/9 |
| 2004/0073924 A1 * | 4/2004 | Pendakur | 725/46 |
| 2004/0088729 A1 * | 5/2004 | Petrovic et al. | 725/91 |
| 2004/0117831 A1 * | 6/2004 | Ellis et al. | 725/53 |
| 2004/0203630 A1 * | 10/2004 | Wang | 455/414.1 |
| 2005/0020223 A1 * | 1/2005 | Ellis et al. | 455/186.1 |
| 2005/0028207 A1 | 2/2005 | Finseth et al. | |
| 2005/0149964 A1 * | 7/2005 | Thomas et al. | 725/9 |
| 2005/0204387 A1 * | 9/2005 | Knudson et al. | 725/52 |
| 2005/0262542 A1 * | 11/2005 | DeWeese et al. | 725/106 |
| 2006/0010470 A1 * | 1/2006 | Kurosaki et al. | 725/46 |
| 2006/0041904 A1 * | 2/2006 | Lee | 725/28 |
| 2006/0043164 A1 * | 3/2006 | Dowling et al. | 235/375 |
| 2007/0076872 A1 * | 4/2007 | Juneau | 380/202 |
| 2007/0136753 A1 * | 6/2007 | Bovenschulte et al. | 725/46 |
| 2007/0226765 A1 * | 9/2007 | Bahnck et al. | 725/63 |
| 2007/0244750 A1 * | 10/2007 | Grannan et al. | 705/14 |
| 2008/0066103 A1 * | 3/2008 | Ellis et al. | 725/38 |
| 2008/0262901 A1 * | 10/2008 | Banga et al. | 705/10 |

FOREIGN PATENT DOCUMENTS

| | | |
|---|---|---|
| IE | 62348 | 1/1995 |
| JP | 2005347806 | 12/2005 |
| WO | WO 97/34413 | 9/1997 |
| WO | 97/49242 | 12/1997 |
| WO | WO 99/45700 | 9/1999 |
| WO | WO 00/27124 | 5/2000 |
| WO | WO 01/76248 | 10/2001 |
| WO | WO 2005/114983 | 12/2005 |

OTHER PUBLICATIONS

International Search Report and Written Opinion dated Jun. 11, 2008 in International counterpart Application No. PCT/US07/04220 corresponding to U.S. Appl. No. 11/707,798, filed Feb. 16, 2007 by David Shanks et al.

Zhang, Liang-Jie; Liu, Lurng-Kuo; Xie, Dong; Lipscomb, James S.; Zhou, Qun; "A Per-Object Granularity Tracking Mechanism for Interactive TV Viewership Estimation and Program Rating"; Multimedia Software Engineering 2002 Proceedings, Fourth International Symposium; Dec. 11-13, 2002; Piscataway, New Jersey US; XP010632739; ISBN: 0-7695-1857-5; pp. 98-105.

Final Rejection dated Aug. 19, 2010 in U.S. Appl. No. 11/707,798, filed Feb. 16, 2007 by David Shanks et al.

Final Rejection dated Nov. 30, 2009 in U.S. Appl. No. 11/707,798, filed Feb. 16, 2007 by David E. Shanks et al.

Non-final Office action dated Mar. 30, 2011 in U.S. Appl. No. 11/707,798, filed Feb. 16, 2007 by David E. Shanks et al.

Final Rejection dated Oct. 4, 2011 in U.S. Appl. No. 11/707,798, filed Feb. 16, 2007 by David E. Shanks et al.

Non-final Office action dated Mar. 28, 2012 in U.S. Appl. No. 11/707,798, filed Feb. 16, 2007 by David E. Shanks et al.

Final Rejection dated Dec. 21, 2012 in U.S. Appl. No. 11/707,798, filed Feb. 16, 2007 by David E. Shanks et al.

\* cited by examiner

AMALGAMATION OF USER DATA FOR GEOGRAPHICAL TRENDING

CROSS-REFERENCE TO RELATED APPLICATIONS

This application claims the benefit of U.S. Provisional Application Ser. No. 60/774,352, filed on Feb. 17, 2006.

BACKGROUND OF THE INVENTION

1. Field of the Invention

The present invention relates generally to satellite video systems, and in particular, to a method, apparatus, and article of manufacture for determining viewership of individual programs in a real-time environment.

2. Description of the Related Art

Satellite broadcasting of communications signals has become commonplace. Satellite distribution of commercial signals for use in television programming currently utilizes multiple feedhorns on a single Outdoor Unit (ODU) which supply signals to up to eight IRDs on separate cables from a multiswitch.

Figure 1:
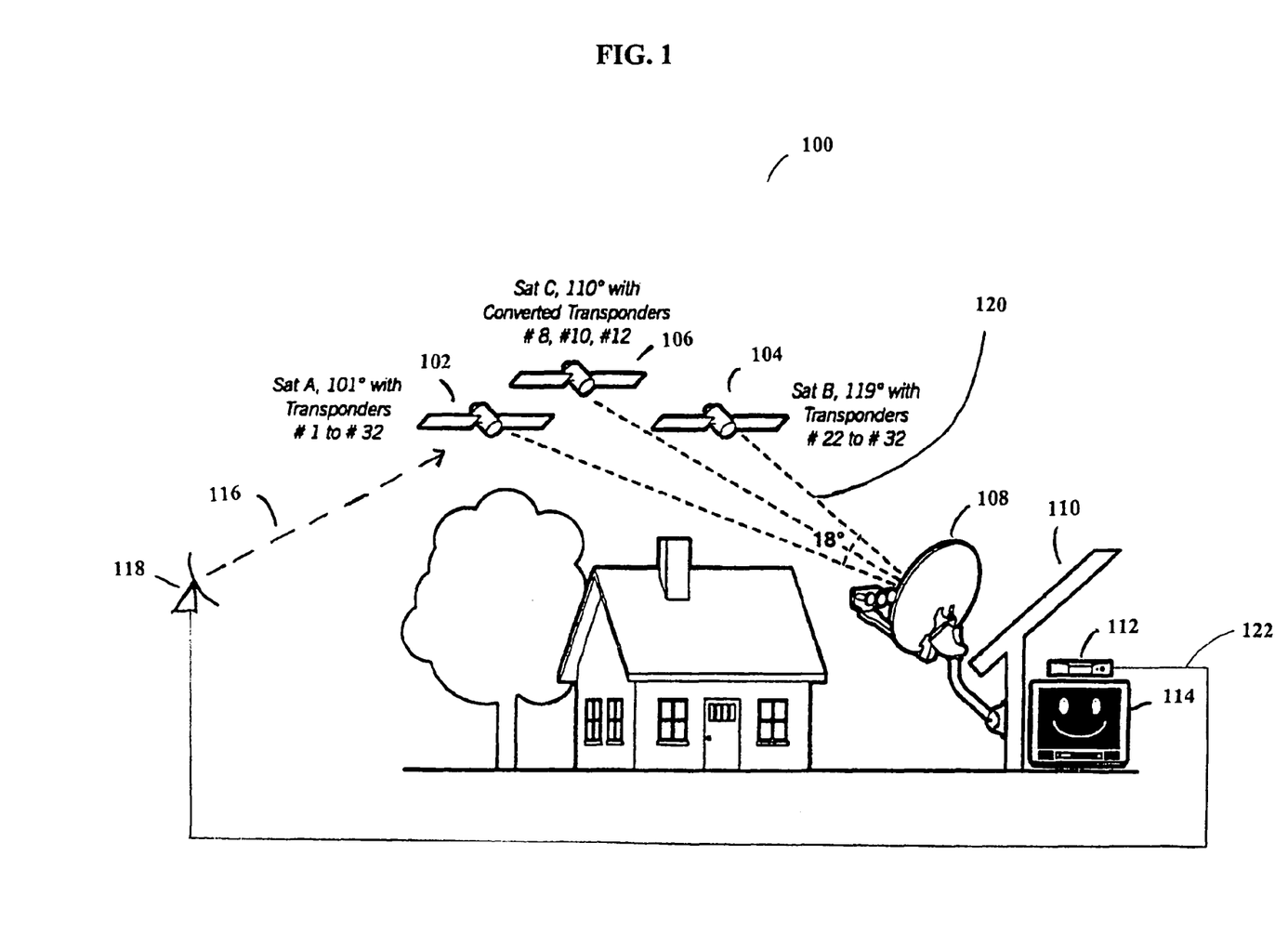
FIG. 1 illustrates a typical satellite television installation of the related art.

FIG. 1 illustrates a typical satellite television installation of the related art.

System 100 uses signals sent from Satellite A (SatA) 102, Satellite B (SatB) 104, and Satellite C (SatC) 106 that are directly broadcast to an Outdoor Unit (ODU) 108 that is typically attached to the outside of a house 110. ODU 108 receives these signals and sends the received signals to IRD 112, which decodes the signals and separates the signals into viewer channels, which are then passed to monitor 114 for viewing by a user. There can be more than one satellite transmitting from each orbital location and additional orbital locations without departing from the scope of the present invention.

Satellite uplink signals 116 are transmitted by one or more uplink facilities 118 to the satellites 102-106 that are typically in geosynchronous orbit. Satellites 102-106 amplify and rebroadcast the uplink signals 116, through transponders located on the satellite, as downlink signals 120. Depending on the satellite 102-106 antenna pattern, the downlink signals 120 are directed towards geographic areas for reception by the ODU 108.

Alternatively, uplink facilities 118 can send signals via cable 122 either in conjunction with uplink signals 116 or instead of uplink signals 116 to IRD 112, for display on monitor 114.

Each satellite 102-106 broadcasts downlink signals 120 in typically thirty-two (32) different frequencies, which are licensed to various users for broadcasting of programming, which can be audio, video, or data signals, or any combination. These signals are typically located in the Ku-band of frequencies, i.e., 11-18 GHz, or in the Ka-band of frequencies, i.e., 18-40 GHz, but typically 20-30 GHz.

As satellites 102-106 broadcast additional services and additional channels to viewers, viewers will like and expect to see programming on monitor 114 that relate to their specific needs and desires.

SUMMARY OF THE INVENTION

To minimize the limitations in the prior art, and to minimize other limitations that will become apparent upon reading and understanding the present specification, the present invention discloses a dynamic viewership rating system presented on a monitor. A system in accordance with the present invention comprises a plurality of broadcast programs, each broadcast program in the plurality of broadcast programs given a rating, the rating based on a current viewership of the plurality of broadcast programs within a geographical area, and a control bar, displayed on the monitor, wherein a command displayed on the control bar selects a screen for display on the monitor, the screen comprising information related to at least one of the ratings of the plurality of broadcast programs.

Such a system further optionally includes the current viewership being determined by callback information gathered from a plurality of receivers that are receiving the broadcast programs, the plurality of receivers being located in a second geographical area, the geographical area being a subset of the second geographical area, the second geographical area being determined by zip code or time zone, and a rating determined in a first time zone being used to predict a rating in a second time zone.

An apparatus in accordance with the present invention comprises a broadcast delivery system, comprising a transmitter and a receiver, a monitor, coupled to the receiver, for selectively displaying the plurality of broadcast programs, and a feedback system, coupled to the receiver, for determining a rating of at least one of the plurality of broadcast programs, the rating based on a current viewership of the plurality of broadcast programs within a geographical area.

Such an apparatus further optionally includes a control bar, displayed on the monitor, wherein a command displayed on the control bar selects a screen for display on the monitor, the screen comprising information related to at least one of the ratings of the plurality of broadcast programs, the broadcast delivery system being a satellite television delivery system, the information comprising a trend statistic for each of the plurality of broadcast programs, the statistics further comprising an indication of a number of other viewers that are viewing each of the plurality of broadcast programs, the current viewership being determined by callback information gathered from a plurality of receivers that are receiving the broadcast programs, the plurality of receivers being located in a second geographical area, the geographical area being a subset of the second geographical area, the second geographical area being determined by zip code, the second geographical area being determined by time zone, a rating determined in a first time zone being used to predict a rating in a second time zone, the feedback system being a telephone callback system, the statistics being accessed by a selection of a remote control command button the plurality of broadcast channels being presented by genre, and the selection of the remote control button reaching a different default genre based on a channel being viewed when the selection of the remote control button is made.

Other features and advantages are inherent in the system disclosed or will become apparent to those skilled in the art from the following detailed description and its accompanying drawings.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

The present invention is a dynamic viewership rating system presented on a monitor. A system in accordance with the present invention comprises a plurality of broadcast programs, each broadcast program in the plurality of broadcast programs given a rating, the rating based on a current viewership of the plurality of broadcast programs, and a control bar; displayed on the monitor, wherein a command displayed on the control bar selects a screen for display on the monitor, the screen comprising information related to at least one of the broadcast programs in the plurality of broadcast programs.

Interactive Mosaic Channel Display Diagram

Figure 2A:
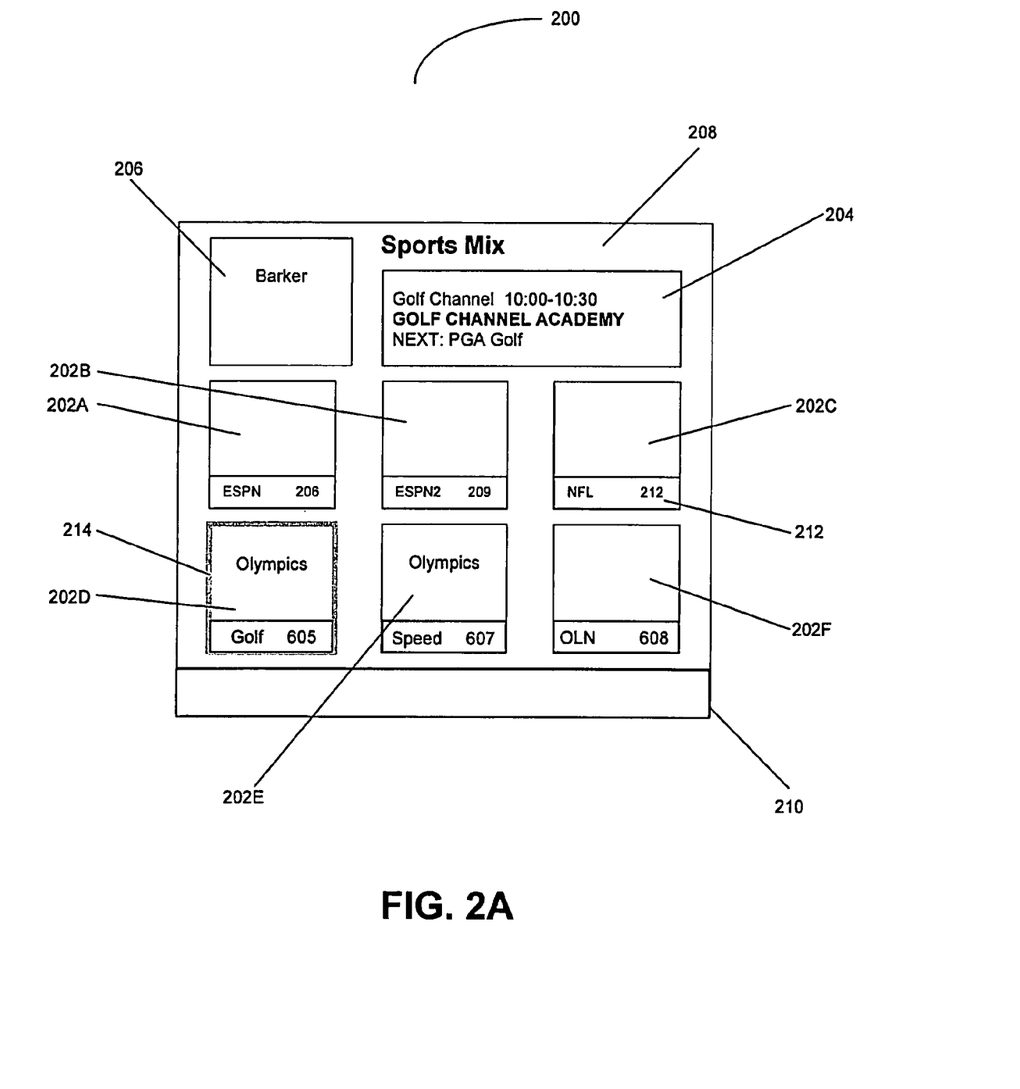
FIG. 2A illustrates a typical six-cell matrix with a generic video feed in accordance with the present invention.

FIG. 2A illustrates a typical matrix with a generic video feed in accordance with the present invention.

Interactive mosaic channel 200 is shown as being displayed on monitor 114. Within interactive mosaic channel 200, there are a number of video cells 202A-202F and a text box 204, also referred to as an On Screen Display (OSD) 204. Optionally, the interactive mosaic channel 200 further comprises a separate video cell 206, also called a "barker cell" 206, a background video 208, and a control bar 210. The video cells 202A-F optionally comprise a channel identification (channel ID) portion 212. Further, cursor 214 is also optionally included to allow for interaction with each of the video cells 202A-202F and barker cell 206.

The number of video cells 202A-F can change based on the number of video cells 202A-F desired. As the number of video cells 202A-F increases, of course, there must be a reduction in the size of the video cells 202A-F to ensure that the video cells are differentiated on the monitor 114. As the number of video cells 202A-F decreases, the size of the video cells 202A-F can increase, since there is more space available on monitor 114 to display video cells 202A-F.

Further, the placement of video cells 202A-F, barker cell 206, text box 204, and control bar 210 is not limited to the positions on monitor 114 as shown in FIG. 2A. These elements can be displayed anywhere on monitor 114 without departing from the scope of the present invention.

As there are multiple video feeds and video cell 202A-F and barker cell 206 being presented, each video cell 202A-F and barker cell 206, as well as background video 208 and possibly control bar 210, have associated audio portions that can be played. Presenting more than one audio stream may be confusing; as such, it is typical that only one audio stream of information is presented at a given time. However, each of the video feeds may also have closed-captioning information associated with it, and selection of a closed-captioned presentation, rather than an audio presentation, can be performed as described herein.

Video Cells

Video cells 202A-F each comprise a separate viewer channel of programming. So for example, in an interactive mosaic channel that is focused on news programming, cell 1 could contain the video programming associated with the viewer channel of FOX News Channel, cell 2 could contain the video programming associated with the viewer channel of CNN, cell 3 could contain the video programming associated with the viewer channel of Headline News, cell 4 could contain the video programming associated with the viewer channel of MSNBC, cell 5 could contain the video programming associated with the viewer channel of The Weather Channel, and cell 6 could contain the video programming associated with the viewer channel of C-SPAN. The placement and video programming content for each video cell 202A-F can depend on a wide variety of factors, such as Nielsen ratings for a given channel, whether a given channel is available on a specific viewer's programming package, viewer channel number (lowest to highest or highest to lowest) or can be decided or changed based on programming that is present on one or more of the viewer channels available for the interactive mosaic channel. For example, and not by way of limitation, an important vote on the floor of the Senate may be taking place, and a decision can be made to change the placement of C-SPAN from video cell 202F to video cell 202A for a period of time. Changes in presentation for the interactive mosaic channel 200 are discussed below.

Within each of the video cells 202A-F is a channel identification (ID) box 212. Typically, the channel ID box 212 indicates to the viewer the moniker or name that is associated with the video feed being shown in that respective video cell 202A-F, and the viewer channel number associated with the video feed being shown in that respective video cell 202A-F. For example and not by way of limitation, in video cell 202A, which as described above, is showing the video feed for ESPN, channel ID box 212 would indicate "ESPN" as well as, optionally, a channel number, e.g., "206" to indicate to the viewer that the video feed being shown in video cell 202A is that of ESPN, and that the viewer is accustomed to seeing this full-monitor 114 video programming on viewer channel 206.

Other information may also appear in channel ID box 212, such as an indication that the video feed that is being presented in the associated video cell 202A-F is a "user favorite" channel, the channel ID box 212 may be presented in a different color or video texture to indicate that the video feed that is being presented in the associated video cell 202A-F is a channel that presents programming that adults may wish to block from their children's view or has closed-captioning available, etc. Many possibilities are available within the scope of the present invention to present various types of video information within channel ID box 212 for viewer selection and benefit. The channel ID box 212 may also appear without a video cell 202A-F for those video feeds that are channel blocked via parental control, or otherwise unavailable to a specific viewer because of the viewer's programming package or other reasons.

Text Box

Text box 204 contains textual information that is useful to the viewer, and this information can change depending on the viewer's selection of interactive services as described herein. For example, the text box 204 can contain a generic statement about the genre of the interactive mosaic channel 200, or statements directed to a selected video cell 202A-F or information related to the channel ID box 212 to describe to a user the meaning of the information presented in the channel ID box 212 or other information related to the video cell 202A-F and channel ID box 212. The text box can also scroll to present additional information to the viewer that does not all fit within text box 204 at a given time.

There can also be default text associated with each interactive mosaic channel 200, and, depending on the capabilities of IRD 112, each time an interactive mosaic channel 200 is tuned to, a default descriptive text shall be displayed in the text box 204.

Barker Cell

Barker cell 206 is a presentation of video data that can relate to the video cells 202A-F that are present in interactive mosaic channel 200. For those interactive mosaic channels 200 that have the optional barker cell 206, the barker cell 206 can use audio or video clues to direct the user to one of the video cells 202A-F for more information on a given topic, or provide an overview of the information presented within the video cells 202A-F. For example, the audio and video associated with barker cell 206 in a news format can be a series of stories that are being covered in more depth on the viewer channels being shown in video cells 202A-F, and the barker cell 206 audio and video can then direct the viewer to tune the IRD 112 or monitor 114 to a specific video cell 202A-F for more information on that topic. The barker cell 206 can also be used to provide an overview of the news stories, either those presented in video cells 202A-F or other news stories of interest, without directing the viewer to one of the video presentations being discussed in the video feeds shown in video cells 202A-F.

Barker cell 206 can present audio and video information that is not available on any other viewer channel that is accessible to IRD 112 or monitor 114, other than within the barker cell 206 of the interactive mosaic channel 200. When the barker cell 206 presents audio and video information that is not present on any other viewer channel accessible to IRD 112 or monitor 114, then the barker cell 206 does not have an associated channel ID box 212.

Background Video

Background video 208 is typically a backdrop for the interactive mosaic channel 200. The background video 208 can be related to the genre of the interactive mosaic channel 200; for example, in a news environment, the background video 208 can be related to a top news story, the stock market exchange building, a prominent government building, etc. The background video 208 can be changed or can be a dynamic video depending on the desires of the editorial staff or viewer preferences. Further, the background video 208 can be a logo or other indicator of the source of the interactive mosaic channel 200, such as DIRECTV.

Interactive Features

Figure 2B:
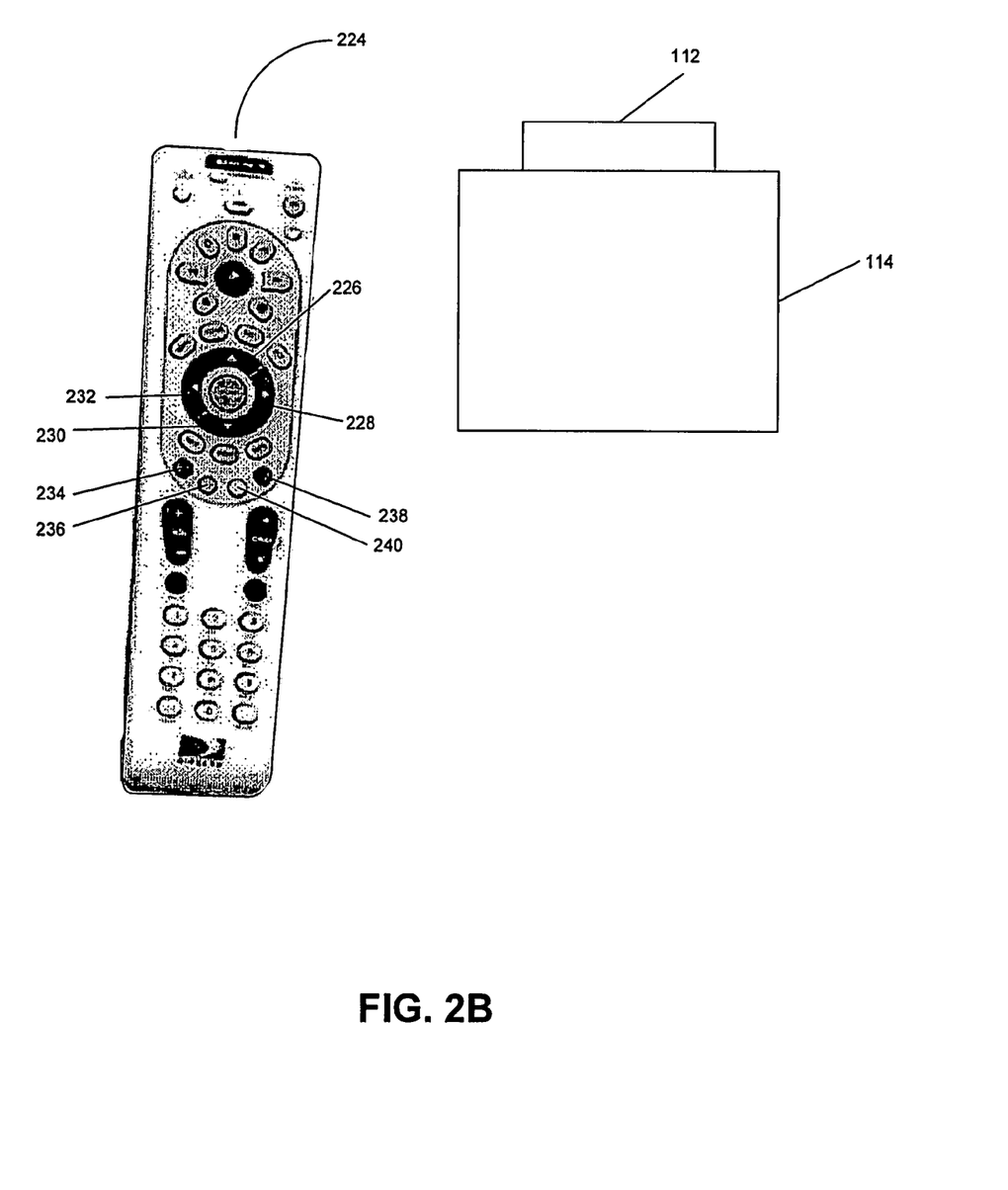
FIG. 2B illustrates a remote control used in the present invention.

FIG. 2B illustrates a remote control used in the present invention.

Typically, IRD 112 and monitor 114 are controlled by a remote control device 224, which allows viewers a convenient way to control audio volume, channel selection, and other features and display characteristics from a distance away from the IRD 112 and/or monitor 114.

Each video cell 202A-F has an associated channel ID box 212, and one of the video cells, cell 202D, has a cursor 214 surrounding that specific video cell 202 and, optionally, channel ID box 212. The cursor 214 indicates that the specific video cell 202 and channel ID 212 has been selected by the viewer. The cursor 214 is typically controlled by buttons 226-232, but can be controlled by other buttons on the remote control 224 if desired.

By selecting a given video cell 202A-F, the viewer is selecting a specific characteristic associated with that given video cell 202A-F, or associated video feed used to generate that video cell 202A-F. In most instances, when the viewer selects a given video cell 202, the audio portion associated with the selected video cell 202 will be presented to the viewer, rather than the audio portion associated with the barker cell 206 or a generic audio track that is associated with interactive mosaic channel 200. Further, selection of a given video cell 202A-F with cursor 214 may also select a closed captioning data stream associated with the selected video cell 202, depending on the availability of such a data stream and/or other settings that a viewer has selected. Cursor 214 can be moved to any of the video cells 202A-F, and, optionally, can be moved to select text box 204 or control bar 210.

When cursor 214 is moved to a given video cell 202A-F via buttons 226-232, text box 204 also may undergo a change in information. Typically, when the video cell 202A-F is selected by the viewer, indicated by the presence of cursor 214, text box 204 will present the information in the Advanced Program Guide (APG) that is associated with the viewer channel selected by cursor 214. The APG typically includes information on the program or "show" that is currently being presented by the viewer channel shown in video cell 202A-F, as well as the time that show is being aired and the next show to be aired on that viewer channel. Other information, either in the APG or external to the APG, can also be displayed in the text box 204 when the cursor is moved to a given video cell 202A-F.

As such, the viewer can "interact" with the interactive mosaic channel 200 and decide which audio track to listen to, find out a plot line of each of the shows being presented in the various video cells 202, find out what is going to be aired next in the various viewer channels being presented in video cells 202, or listen to generic audio from the barker cell 206 or associated with the interactive mosaic channel 200 itself while variously viewing the video presentations in the video cells 202. If a specific video cell 202 presents video information that is of interest to a viewer, then the viewer can move cursor 214, via a remote control command, to a given video cell 202, and listen to the audio associated with that video cell 202 and find out more about that viewer channel in text box 204.

If the viewer decides that the selected video cell 202 is of enough interest, the viewer can then directly tune to the selected video cell 202, i.e., tune directly to that viewer channel that is providing the video and audio used to create video cell 202, by pressing a single button on the remote control 224 (typically the "select" button on a DIRECTV remote control). This will tune the IRD 112 or monitor 114 to that viewer channel, which will then be presented full-screen to the viewer as in a normal television monitor 114 viewing format.

The barker cell 206, since it typically contains audio and video information that is not located on any viewer channel other than the interactive mosaic channel 200, cannot typically be selected for full screen viewing by the viewer on monitor 114. However, the barker cell 206 can be selected for full monitor 114 viewing, or at least enough of the monitor 114 to allow for changes in the video cells 202 as described below, to allow for changes in the interactive mosaic channel 200 and in the control bar 210 in near-real-time.

Control Bar

The Control Bar 210 (also called the Attract Icon or the Attract Icon Bar) The control bar 210 allows for instant, on-screen access to several data sources that allow the viewer to access data related to that being shown in the video cells 202A-F as well as other viewer channels available within system 100. Those IRDs 112 that have interactive capabilities have special buttons that correspond to the icons that appear on the control bar 210. Each icon/button directs the viewer to a different screen, such as special events, or, in the case of the present invention, data related to real-time or near-real-time viewership of channels within system 100. Each screen can have sub-screens that further allow related data to be viewed or otherwise analyzed by the viewer.

For example, and not by way of limitation, one of the remote control 224 buttons, e.g., the "red" button 234, indicated by text and/or graphics on control bar 210, may take a viewer to the "What's Hot" page, where viewers can review data related to viewership of shows currently being aired within system 100.

Similarly, a "special" page can be accessed by pressing a different button on the remote control 224, e.g., the "green" button 236, or the blue button 238 or yellow button 240, where viewers can view a channel or other data page. The special page can be reprogrammed by the system provider or the viewer based on time, or, in the case of interactive mosaic channel 200, can be done by genre. For example, and not by way of limitation, the special page can be assigned to the NCAA bracket for a "Sports" mosaic channel 200, and, if the viewer changes to a "News" mosaic channel 200, the special page can be a breaking news channel or news recap video loop that is provided by the system provider. There can be more than one special "page" that is accessible from the buttons 234-240, or other buttons on the remote control 224, if desired.

Monitor Displays

Figure 3A:
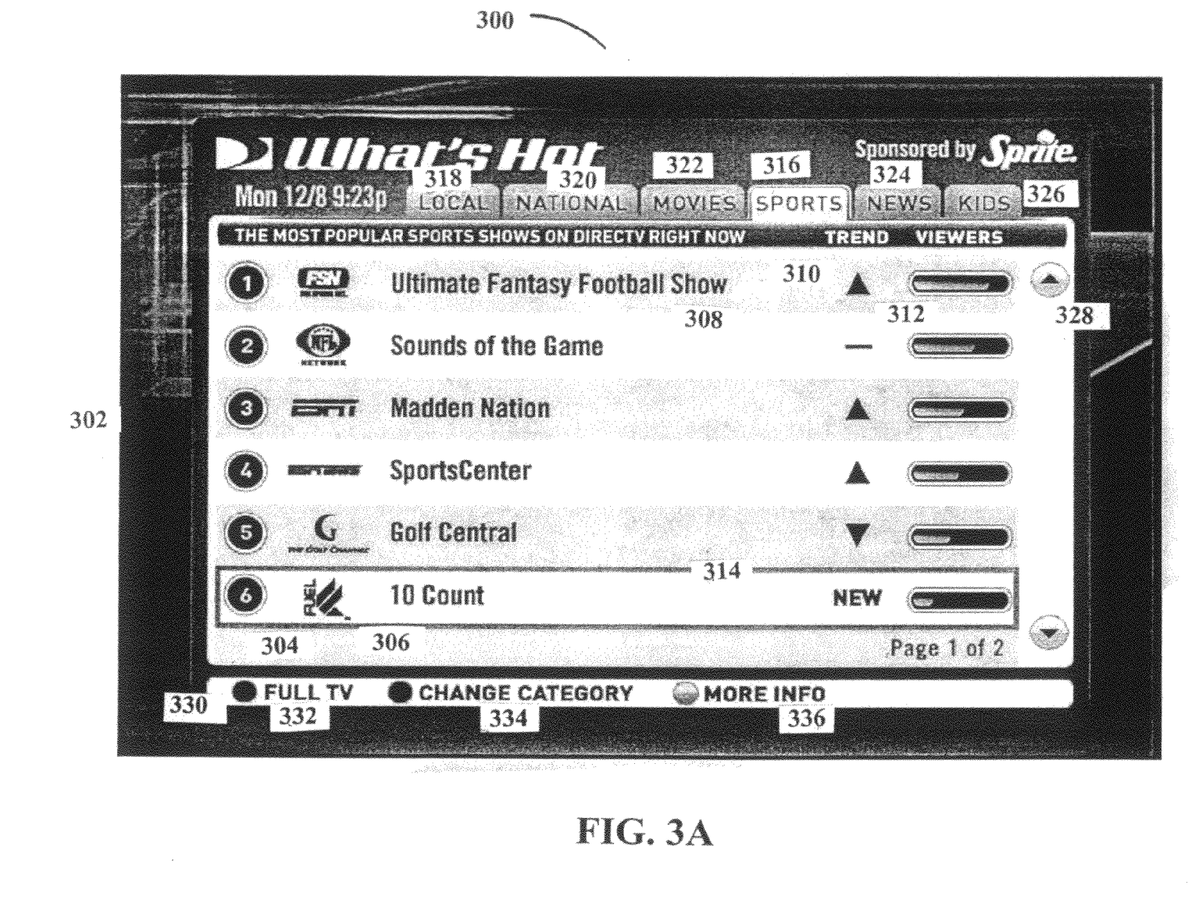
FIGS. 3A-3C illustrate on-monitor displays of a data presentation page in accordance with the present invention.
Figure 3B:
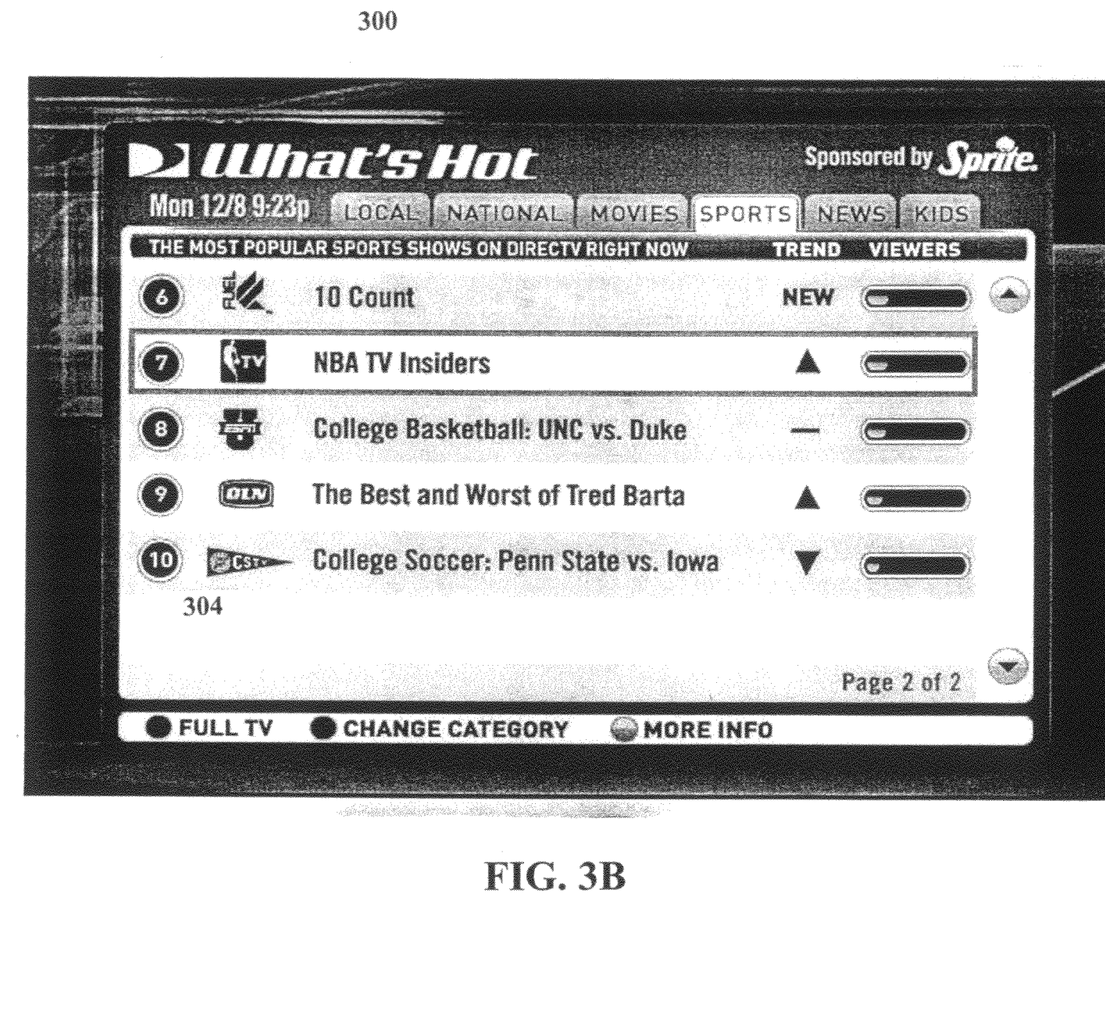
Figure 3C:
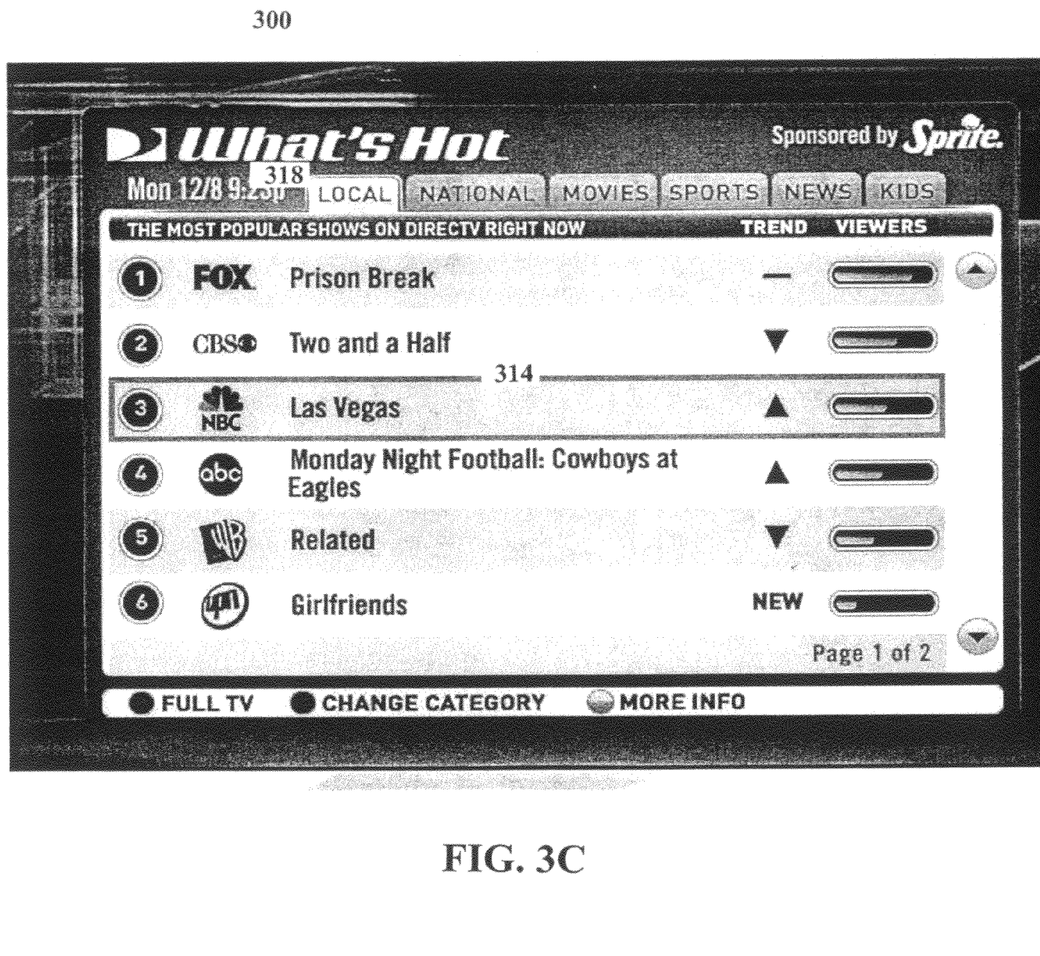

FIGS. 3A-3C illustrate on-monitor displays of data presentation pages in accordance with the present invention.

Page 300 is illustrated, with screen 302, popularity indicator 304, network icon 306, show name 308, trend indicator 310, viewership legend 312, cursor 314, and tabs 316-326. Scroll bar 328 and control bar 330 with icons 332-336 are also shown on page 300.

Screen 302 indicates via popularity indicator 304 the top shows that are being currently aired in system 100 by genre, the genre being indicated by a highlighted tab 316-326. For example, as shown in FIG. 3A, Sports tab 316 is highlighted. Depending on how page 300 is reached, a different tab 316-326 can be highlighted. For example, if page 300 is reached from a mosaic channel 200 that is sports related, the sports tab 316 may be the default tab. Other mosaic channels 200, or other channels in general, may reach different default tabs 316-326. For example, and not by way of limitation, if the page 300 is reached from a local station channel, the default tab may be tab 318; if the page 300 is reached from the same local station during a time period of the national news broadcast, the default tab may be the national tab 320, or the news tab 324. Default tabs 316-326 can be set by the system provider or the viewer based on several factors, including viewer preferences, time period, and channel origination of the page 300 request.

Network icon 306 helps to indicate which network or channel is broadcasting the most popular show, and the program name 308 also indicates to the viewer the program that is currently being aired. Trend indicator 310 shows whether over a given recent time period, whether the viewership of that show has gone up or down, or if it is a new show in the top show lineup on page 300. Viewers indicator 312 shows a relative viewership share, or a pure number of viewers, depending on what is desired by the system provider or viewer.

Cursor 314 allows the viewer to select a given top show for additional information on that show. As shown in FIG. 3A, popularity icon 304 #6, which is a new show in the top lineup, is titled "10 Count" and is currently selected by cursor 314. Now, when icons 332-336 are selected, some of the icons will direct the viewer to, for example, when icon 332, the "red button" 234, is selected, the cursor 314 highlighted show will be sent to full screen on monitor 114. If icon 336, the yellow button 240, is selected, more information on the cursor 314 highlighted show will be displayed, such as APG information or other information on the selected show that is resident within system 100. If icon 334, e.g., the green button 236 is selected, the tabs 316-326 are sequentially or otherwise parsed to see the top shows in other categories.

By using scroll bar 328, either by using the cursor keys 226-232 on remote control 224 or by other methods, FIG. 3B is arrived at, which shows additional shows that are in the top viewership category for a given tab 316-326. The same show may appear in different popularity icon 304 positions depending on which tab 316-326 is selected.

FIG. 3C illustrates selection of a different category, namely, the local category as indicated by the highlighted local tab 318, where different currently airing shows are displayed on screen 300. Selection of icon 334 allows the viewer to scroll through the tabs 316-326, which will display the different popular shows based on the criteria defined by tabs 316-326.

Within screen 302 as shown in FIGS. 3A-3C, the time and date can be displayed, as well as an advertisement for a sponsor or an upcoming "hot event" that will be airing in the future, such as a special sporting event like the Super Bowl, the Olympics, the NCAA Men's Basketball tournament, or other events that may be selectable by using buttons on the remote control 224.

Figure 4:
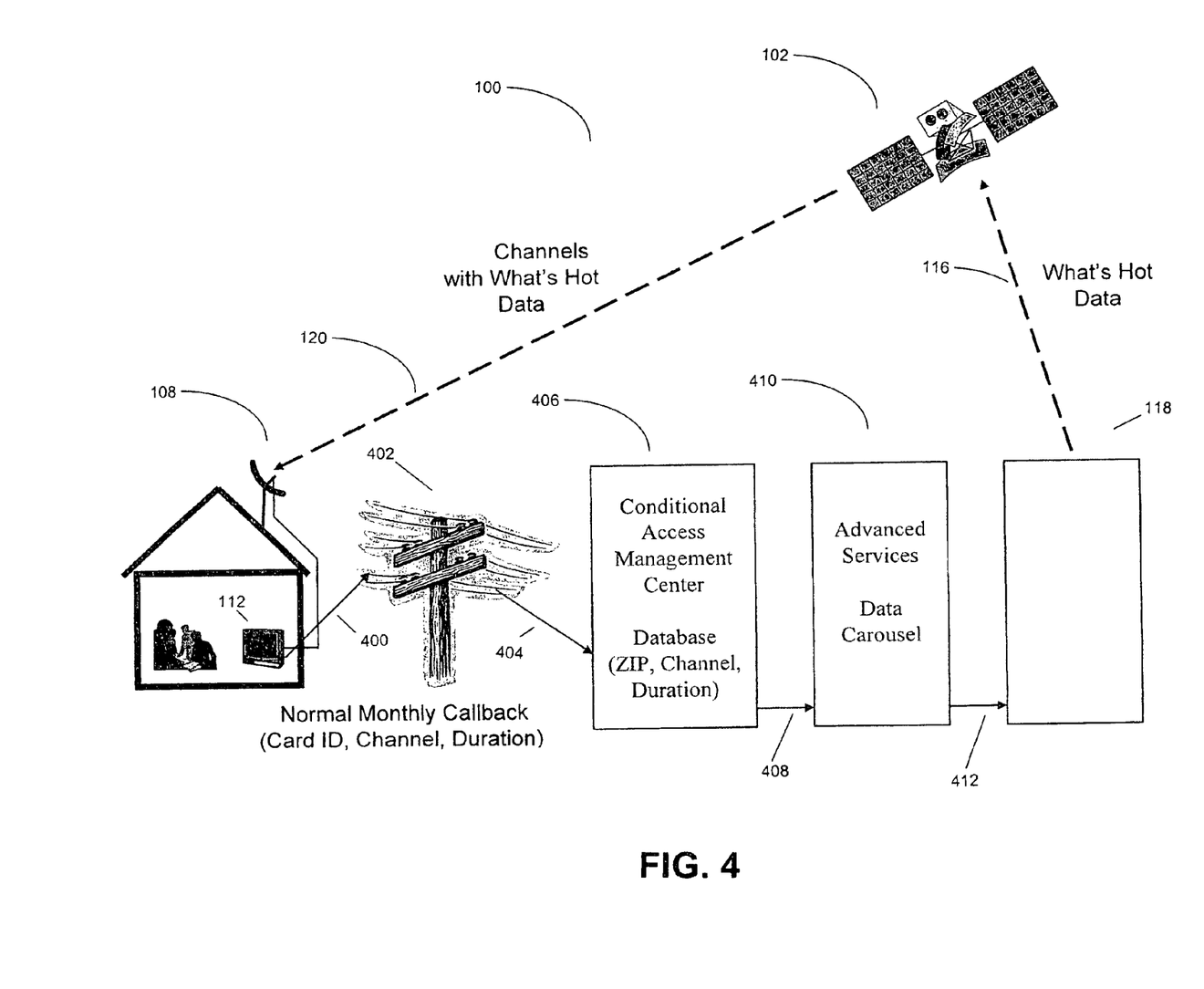
FIG. 4 shows a typical data flow for the present invention.

FIG. 4 shows a typical data flow for the present invention.

System 100 is shown, now with callback information 400 being transmitted from IRD 112 through telephone wires 402 and link 404 to conditional access management center 406. Each IRD 112 that is connected to telephone wires 402 makes a periodic call into the conditional access management center 402 to obtain updates to conditional access codes, request pay-per-view events, and other reasons. Typically, the call in is performed on a monthly basis, but can be performed on a daily or hourly basis if desired. At the center 406, the IRD 112 identification number, current channel information, duration that the IRD was on a given channel, etc., is cross-referenced to the zip code for a given IRD 112. Once the zip code information is obtained, the card ID for that IRD is removed from the data packet 408 that is passed along to the advanced services data center 410, such that individual viewers information is no longer accessible. The advanced services center 410 then amalgamates the data packets 408 from the various viewers, and places it into the proper format to be included with the viewership data pages 300 described herein. Uplink center 118 then sends this data on uplink signals 116 to satellites 102-106 (for ease of understanding, only satellite 102 is shown), and this data is sent down via downlink signals 120 to IRD 108. The viewership data can be sent on mosaic channels 200, or on regular channels as a control bar 110 that is accessible from any channel that is received and demodulated by IRD 112, as well as being accessible from other portions of the data viewable on monitor 114, e.g., guide data.

Amalgamation of Data and Geographical Tagging

Figure 5:
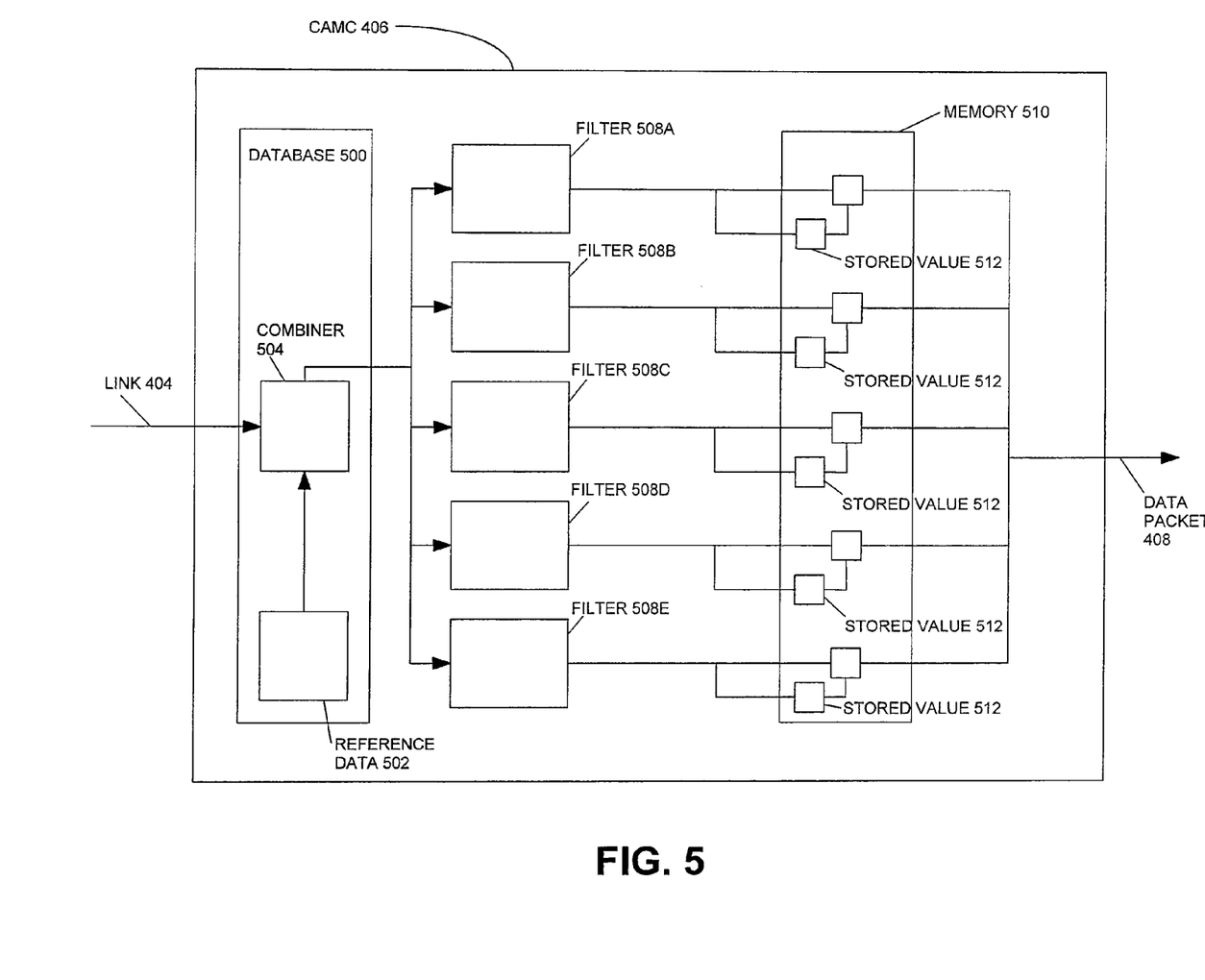
FIG. 5 illustrates the data compilation of the present invention.

FIG. 5 illustrates the data compilation of the present invention.

Conditional Access Management Center (CAMC) 406 receives data on link 404 from IRDs 112 within a geographical area. The geographical area may be the entire United States, or can be local areas if desired. The data on link 404 typically comprises a smart card identification number, a channel number, and a length of time that the IRD 112 has spent on a given channel.

The CAMC 406 uses link 404 to verify and/or provide conditional access for IRD 112 based on the IRD 112 customer service plan, pay-per-view access, etc. Further, CAMC 406 uses link 404 to ensure that IRD 112 is working properly in case of a problem or trouble report received from the viewer using IRD 112.

Once CAMC 406 receives data on link 404, the data is supplied to a database 500 to verify that the IRD 112 sending the data is authorized to receive data, etc. If the channel number, or the smart card identification number, is not authorized for the IRD 112, access for that IRD to system 100 is shut down or limited to the proper access level. For the present invention, rather than refer to the data sent on link 404 by smart card identification number, the channel information, duration of viewing on channel, and other information is given a new reference piece of data by database 500. Typically, this reference data 502 is a zip code, but can also be a city name, state name, or other generalized geographical data point which will give a geographical location to the data received on link 404. This reference data 502 is then combined with data on link 404 in combiner 504, and the combined data 506 is then used.

Combined data 506 is then sent through several filters 508 to organize the combined data for presentation on pages 300. For example, filter 508A may filter out all of the combined data 506 that is being viewed in the Pacific Time Zone; this can be done by sorting all of the combined data 506 by zip code, city name, state, etc. or by any other reference data 502 point. Filter 508B may filter out all of the combined data 506 that is being viewed in the Los Angeles area; again, this can be done by sorting all of the combined data 506 by the reference data 502 point, or by other parts of combined data 506. This process of filtering or amalgamating the individual pieces of combined data 506 allows CAMC 406 to provide inputs to pages 300.

After filtering and amalgamating the combined data 506, the data is stored for future use in memory 510. Prior to storing the filtered data, the data is compared to a previously stored value 512 for that data point, such that trend indicator 310 can be properly displayed on pages 300.

So, for example, if there is no previously stored data point 512 for a given data point, e.g., the Pacific Time Zone viewership combined data 506, all of the trend indicators 310 would indicate "new" or some other moniker to show on pages 310. For those channels that had a change between filtered data and previously stored value 512, the trend indicator 310 for those channels would show a change in a positive direction when the filtered data increased over the previously stored value 512, or a negative direction when the filtered data decreased with respect to the previously stored value 512. If there was no change between the filtered data and the previously stored value, or if the change was insignificant with respect to the previously stored value 512, the trend indicator 310 would show that there was no change in viewership.

The combined data 506, after filtering and amalgamation, can be sorted in any way desired. Further, projections of viewership of future aired programs, based on prior viewership data, can be presented on screens 300, based on previously stored values 510 for given channels or broadcast programming that is presented at given times, as well as allowing system 100 to provide viewers information for those shows that are presented at staggered airtimes. The present invention also allows for a projection of a viewership in one geographic area based on the viewership in another geographic area. For example, and not by way of limitation, a given show that is being broadcast in the Eastern Time Zone may receive a certain viewership rating on pages 300 that would be displayed on monitors 114 in the Eastern Time Zone during that broadcast. The same show would be shown three hours later in the Pacific Time Zone, and, thus, a prediction can be made for the Pacific Time Zone viewers that the upcoming broadcast will be a top rated broadcast. Such indicators can be made on pages 300, or on any other channel that can be displayed on monitor 114 by IRD 112.

Other Features of the Viewership Screens

As described with respect to FIG. 3, when the pages 300 are being viewed, the service provider, and the viewer, have the ability to black out or disable viewer channels, and, as such, have the ability to black out or disable selection of a viewer channel or program from pages 300.

For example, a given viewer may have a programming package that does not provide access to a specific viewer channel, e.g., ESPN. If the video feed that is used for viewer channel ESPN is showing a popular show that is currently in the top viewership of a given tab 316-326, there are several options as to how to display the ESPN channel without inadvertently giving a user access to the video information on the unauthorized viewer channel. For example, the unauthorized or blocked channel may use a channel logo graphic to fill that slot on screen 302, and still provide the channel name/moniker and channel number for viewing to the viewer. The page 300 may use a generic graphic to inform the viewer that an upgrade is available to the viewer's programming package that would enable the viewer to see the video information on that channel, and assist the viewer in upgrading their service to receive that channel. The service provider may also choose to present no text or graphics in that part of page 300 at all.

Further, parental controls are applicable to each page of the pages 300 shown. For example, a page 300 may indicate that a movie is being shown that exceeds the parental limits set for a given IRD 112 or monitor 114. In such cases, direct tuning to that channel from page 300 may require a password, or may be blocked from viewing on monitor 114, until the parental control limit is raised or the programming on that viewer channel drops below the set parental control limit.

CONCLUSION

The present invention comprises a viewership rating system presented on a monitor. A system in accordance with the present invention comprises a plurality of broadcast programs, each broadcast program in the plurality of broadcast programs given a rating, the rating based on a current viewership of the plurality of broadcast programs within a geographical area, and a control bar; displayed on the monitor, wherein a command displayed on the control bar selects a screen for display on the monitor, the screen comprising information related to at least one of the ratings of the plurality of broadcast programs.

Such a system further optionally includes the current viewership being determined by callback information gathered from a plurality of receivers that are receiving the broadcast programs, the plurality of receivers being located in a second geographical area, the geographical area being a subset of the second geographical area, the second geographical area being determined by zip code or time zone, and a rating determined in a first time zone being used to predict a rating in a second time zone.

An apparatus in accordance with the present invention comprises a broadcast delivery system, comprising a transmitter and a receiver, a monitor, coupled to the receiver, for selectively displaying the plurality of broadcast programs, and a feedback system, coupled to the receiver, for determining a rating of at least one of the plurality of broadcast programs, the rating based on a current viewership of the plurality of broadcast programs within a geographical area.

Such an apparatus further optionally includes a control bar, displayed on the monitor, wherein a command displayed on the control bar selects a screen for display on the monitor, the screen comprising information related to at least one of the ratings of the plurality of broadcast programs, the broadcast delivery system being a satellite television delivery system, the information comprising a trend statistic for each of the plurality of broadcast programs, the statistics further comprising an indication of a number of other viewers that are viewing each of the plurality of broadcast programs, the current viewership being determined by callback information gathered from a plurality of receivers that are receiving the broadcast programs, the plurality of receivers being located in a second geographical area, the geographical area being a subset of the second geographical area, the second geographical area being determined by zip code, the second geographical area being determined by time zone, a rating determined in a first time zone being used to predict a rating in a second time zone, the feedback system being a telephone callback system, the statistics being accessed by a selection of a remote control command button the plurality of broadcast channels being presented by genre, and the selection of the remote control button reaching a different default genre based on a channel being viewed when the selection of the remote control button is made.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description.

What is claimed is:

1. A dynamic viewership rating system comprising:
 a receiver, for receiving a plurality of broadcast programs and a rating for each broadcast program in the plurality of broadcast programs, the rating based on a current relative viewership share of the plurality of broadcast programs within a geographical area, wherein a smart card identification number is associated with the receiver;
 an access center, coupled to the receiver, wherein the access center periodically receives viewership information from a plurality of receivers, wherein the viewership information comprises the smart card identification number associated with each of the plurality of receivers, channel number and a length of time each of the plurality of receivers has spent on a given channel, wherein the smart card identification number received in the viewership information is cross-referenced to a generalized geographical data point associated with each of the plurality of receivers, the smart card identification number is removed from the viewership information and is no longer accessible, the smart card identification number is replaced with the generalized geographical data point associated with each of the receivers by the access center to reports the current viewership;
 the receiver displays, on a monitor, an interactive mosaic interface comprising a plurality of video cells and a control bar, each of the plurality of video cells comprises video programming content of a broadcast program and a channel identification, wherein a command displayed on the control bar selects a screen for display on the monitor via the receiver; and
 the screen comprising a list of the plurality of broadcast programs, wherein the list is sorted based on the rating and the sorted list is updated based on a current viewership rating, the screen further comprising trend data for the at least one of the ratings wherein the trend data is transmitted with the plurality of broadcast programs.

2. The viewership rating system of claim 1, wherein the current viewership is determined by callback information gathered from a plurality of receivers that are receiving the broadcast programs.

3. The viewership rating system of claim 2, wherein the plurality of receivers are located in a second geographical area, the geographical area being a subset of the second geographical area.

4. The viewership rating system of claim 3, wherein the second geographical area is determined by zip code.

5. The viewership rating system of claim 3, wherein the second geographical area is determined by time zone.

6. The viewership rating system of claim 5, wherein a rating determined in a first time zone is used to predict a rating in a second time zone.

7. The system of claim 1 wherein the receiver is further configured to:
 receive a selection, on the screen, of one of the plurality of broadcast programs displayed in the list; and
 in response to the selection, send the selected one of the plurality of broadcast programs to full screen on the monitor.

8. An apparatus for determining a dynamic viewership rating of a plurality of broadcast programs, comprising:
 a broadcast delivery system, comprising a transmitter and a plurality of receivers, wherein a smart card identification number is associated with each of the plurality of receivers;
 a feedback system, coupled to the plurality of receivers, for determining a rating of each of the plurality of broadcast programs, the rating based on a current relative viewership share of the plurality of broadcast programs within a geographical area, wherein:
 the feedback system periodically receives viewership information from the plurality of receivers;
 the viewership information comprises the smart card identification number associated with each of the plurality of receivers, channel number and a length of time each of the plurality of receivers has spent on a given channel;
 the smart card identification number received in the viewership information is cross-referenced to a generalized geographical data point associated with each of the plurality of receivers;
 the smart card identification number is removed from the viewership information and is no longer accessible;
 the smart card identification number is replaced with the generalized geographical data point associated with each of the receivers by the feedback system to reports the current viewership; and
 wherein:
 a first receiver selectively displays, on a monitor, an interactive mosaic interface comprising a plurality of video cells and a control bar;
 each of the plurality of video cells comprises video programming content of a broadcast program and a channel identification;
 a command displayed on the control bar selects a screen for display on the monitor via the first receiver;
 the screen comprises a list of the plurality of broadcast programs;

the list of the plurality of broadcast programs is sorted based on the rating;

the sorted list is updated based on a current viewership rating; and the screen further comprises trend data for at least one of the ratings wherein the trend data is transmitted with the plurality of broadcast programs.

9. The apparatus of claim 8, further comprising a control bar, displayed on the monitor, wherein a command displayed on the control bar selects a screen for display on the monitor, the screen comprising information related to at least one of the ratings of the plurality of broadcast programs.

10. The apparatus of claim 9, wherein the broadcast delivery system is a satellite television delivery system.

11. The apparatus of claim 10, wherein the information comprises a trend statistic for each of the plurality of broadcast programs.

12. The apparatus of claim 11, wherein the statistics further comprise an indication of a number of other viewers that are viewing each of the plurality of broadcast programs.

13. The apparatus of claim 12, wherein the current viewership is determined by callback information gathered from a plurality of receivers that are receiving the broadcast programs.

14. The apparatus of claim 13, wherein the plurality of receivers are located in a second geographical area, the geographical area being a subset of the second geographical area.

15. The apparatus of claim 14, wherein the second geographical area is determined by zip code.

16. The apparatus of claim 14, wherein the second geographical area is determined by time zone.

17. The apparatus of claim 16, wherein a rating determined in a first time zone is used to predict a rating in a second time zone.

18. The apparatus of claim 17, wherein the feedback system is a telephone callback system.

19. The apparatus of claim 18, wherein the statistics are accessed by a selection of a remote control command button.

20. The apparatus of claim 19, wherein the plurality of broadcast channels are presented by genre.

21. The apparatus of claim 20, wherein the selection of the remote control button reaches a different default genre based on a channel being viewed when the selection of the remote control button is made.

22. The apparatus of claim 8 wherein the receiver is further configured to: receive a selection of one of the plurality of broadcast programs displayed in the list; and in response to the selection, send the selected one of the plurality of broadcast programs to full screen on the monitor.

* * * * *